UNITED STATES PATENT OFFICE.

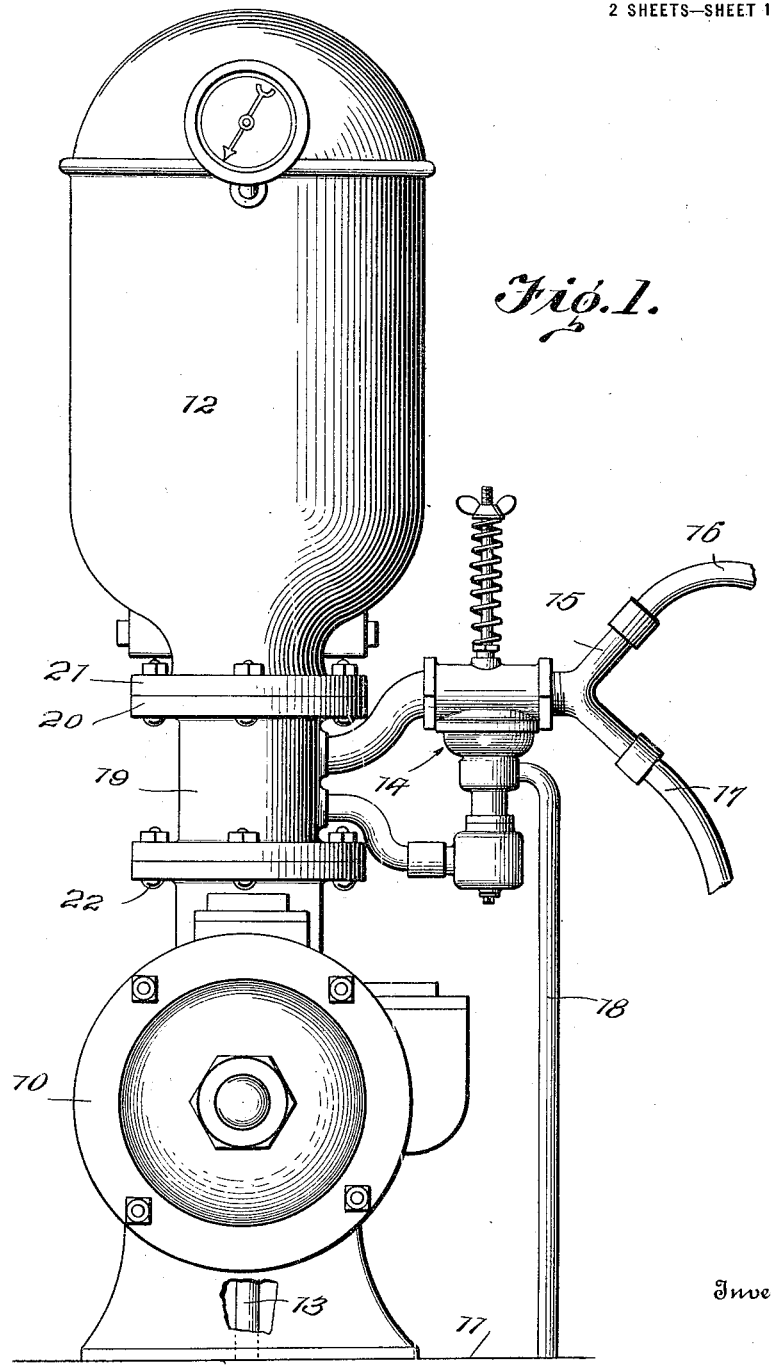

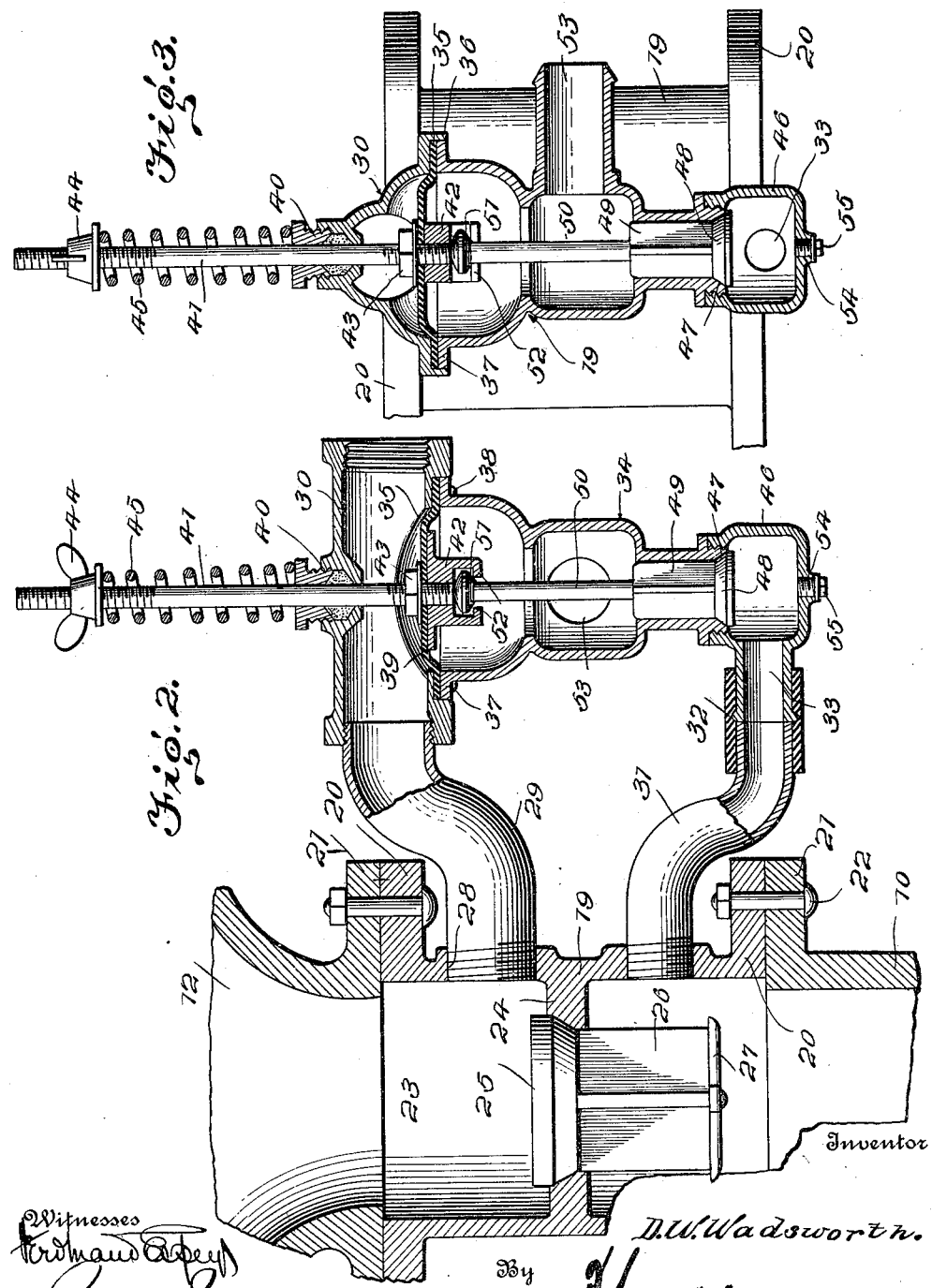

DWIGHT W. WADSWORTH, OF BANGOR, MICHIGAN.

RELIEF-VALVE FOR SPRAYING-PUMPS.

1,142,289.  Specification of Letters Patent.  Patented June 8, 1915.

Application filed March 18, 1913. Serial No. 755,224.

*To all whom it may concern:*

Be it known that I, DWIGHT W. WADSWORTH, citizen of the United States, residing at Bangor, in the county of Van Buren and State of Michigan, have invented certain new and useful Improvements in Relief-Valves for Spraying-Pumps, of which the following is a specification.

My invention relates to new and useful improvements in relief valves for spray pumps and constitutes more particularly an improvement over the relief valve construction disclosed in a patent granted to me July 2, 1912, No. 1,031,214.

One object of my present invention is to provide a relief valve structure which will be simpler and more durable than that covered in the above indicated patent.

A further object of my invention is to construct a relief valve structure having a body providing a passageway and branch passage-ways leading from the passage-way, a valve in one passageway and a pressure diaphragm positioned across the main passage-way to automatically govern the passage of fluid through the valve.

A further object of my invention is to so construct this body member that all fluid contained therein may be readily drained from the valve to prevent injury to the same through freezing when the valve is not in use.

A further object of my invention is to construct a relief valve for a power pressure water pump which will automatically relieve the pressure at a predetermined point, the working parts of which will permit of long continued use without wear, thus greatly increasing the efficiency. And a still further object is the provision of a relief valve so constructed that the check or relief valve proper will, when opened by excess pressure, open widely and rapidly to permit unobstructed flow of the liquid, which in sprayers is charged with grit in the form of powders or other chemicals, and so avoid wear of the valve.

With these and other objects in view, my invention will be more fully described, illustrated in the accompanying drawings, and then specifically pointed out in the claims which are attached to and form a part of this application.

In the drawings: Figure 1 is a side elevation of a conventional form of spray pump and its air chamber, showing the application of my relief valve thereto; Fig. 2 is a detail vertical sectional view of my relief valve and portion of a pump with which it is employed; Fig. 3 is a detail vertical sectional view of the relief valve taken at right angles to the section shown in Fig. 2.

Corresponding and like parts are referred to in the following description and indicated in all the views of the drawings by the same reference characters.

In order to insure a clear understanding of the use and operation of my relief valve I have clearly illustrated the same employed in connection with a conventional form of spray pump 10 which is, in this instance, mounted upon a water tank 11 and which is provided with the usual air reservoir or chamber 12. Water is drawn into the pump through a pipe 13 leading from the tank or reservoir to the intake port of the pump and is then discharged from the pump through the relief valve, indicated as a whole by the numeral 14. A pipe 15 leading from the relief valve supplies the fluid to one or more hoses or spray pipes 16 and 17. A hose or pipe 18 also leads from the relief valve to the tank or reservoir 11 to serve as a return passage for any excess fluid supplied by the pump.

Referring more specifically to Figs. 2 and 3 of the drawings, it will be apparent that while my relief valve 14 operates as a unit to govern the water pressure in the system, it is in effect made up of a number of separable portions which, when joined together, form a body providing a fluid passage and a plurality of branch passages leading therefrom, the circulation of the water or other fluid through the valve being governed by a pair of valves mounted in the passage-way and which are in turn controlled by the action of the pump and by a pressure diaphragm extended across the passage-way.

A tubular body portion 19 forms a portion of the main or continuous passage-way and two of the branch passage-ways, the ends of said portion being provided with lateral encircling flanges 20 for engagement between similar flanges 21 of the pump and air chamber, the tubular body portion 19 being secured in place between the two by screws, bolts or other suitable fastening devices 22. The passage or bore 23 of this body portion 19 is reduced intermediate the length of said body member by a thickening of its wall, as shown at 24 to provide a seat for a puppet check valve 25 having guide wings 26 to hold the valve in proper alinement with the valve seat and a spider 27 to limit its movement and prevent the disengagement of its wings from the valve seat. From an inspection of the drawings, it will be clear that this valve normally seats by gravity to close the passage between the pump and air chamber, but that under pressure of fluid driven by the pump it will automatically raise to permit the passage of such fluid to the air chamber. As soon however, as pressure from the pump diminishes, the pressure in the air chamber will force the valve back on its seat and absolutely prevent all return of fluid to the pump.

The body member 19 is provided adjacent its upper end with a tapped bore 28 adapted to receive the threaded end of a coupling member or pipe 29, the opposite end of which is threaded into one end of another tubular body portion 30. The hose supply pipe 15 leads from the opposite end of this body portion 30, as shown in Fig. 1 of the drawings, the fluid passing from the pump and air chamber through the body portion 19, coupling 29 and body portion 30 to the pipe 15.

The object of my invention is to provide means whereby the pressure of the fluid in the body member 30 will permit the passage of fluid from the body member 19 through a bypass back to the tank or reservoir 11 when the pressure becomes too great. To accomplish this, I have provided the body member 19 immediately below the valve seat 24 with a tapped bore to receive a coupling member or pipe 31 forming an alternate means of escape for the fluid forced into the body member 19 by the pump. A hose or other suitable fluid conductor 32 connects the free end of this nipple with the free end of a nipple 33 formed upon a further body member, indicated as a whole by the numeral 34 and coacting with the body member 19 and body member 30, together with the couplings 29 and 32, to form a passage-way. The lower part of the body portion 30 is provided with an enlarged opening 35 surrounded by a downwardly depending flange 36 which engages over the peripheral edge of a laterally directed flange 37 formed upon the upper open end of the body portion 34, the body portions 30 and 34 being secured together by screws, bolts or other fastening devices 38 passed through the flange 37 and into the body portion 30.

The seating of the flange 37 within the flange 36 insures the securing of the body portions in proper alinement with each other, as will be readily understood. Communication between the body portion 30 and the body portion 34 is however, prohibited by the provision of a resilient pressure diaphragm 39, the peripheral edge portion of which is clamped between the flange 37 and that portion of the body member 30 surrounding the opening 35, the central portion of this diaphragm being up-bowed as shown to extend in the passage through the body member 30 and therefore to be subject to all pressure of fluid therein.

A packing box 40 is provided in the wall of the body portion 30 directly above the diaphragm 39 and a rod or stem 41 extends through this stuffing box and has one end passed through a central opening formed in the diaphragm and threaded into a cage 42, while a lock nut 43 is threaded upon the stem to clamp the diaphragm against the upper face of the cage. The free outer end of the stem 41 is threaded to receive an adjusting nut 44 and a helical spring 45 surrounds the stem bearing by one end against the cap of the packing box and by its other end against the nut 44. By means of the spring 45 and adjusting nut 44 the diaphragm 39 may be readily adjusted to operate under any desired pressure in the body portion 30.

The body portion 34 is preferably formed in two parts, the lower part 46 carrying the nipple 33 and being threaded upon the open lower end of the upper part which end is beveled interiorly to form a valve seat 47 for a valve 48 having guide wings 49 and an integrally formed valve stem 50 terminating at its upper end in a head 51 swivelly mounted between the downwardly and inwardly directed oppositely formed fingers 52 of the cage 42. The body portion 34 is provided above the valve 47 with a nipple 53 to which the hose 18 is attached when the valve is in use, while the portion 46 of said member 34 is provided at its lower end with a tapped drain opening 54 normally closed by a threaded plug 55.

In operation I will assume that while the engine is still running, to operate the pump, the hose nozzles are closed to prevent all discharge of liquid. Under these circumstances, if it were not for the relief valve, the pump would force liquid into the air chamber and hose continuously and the pressure would ultimately become so great as to cause injury to the apparatus. It is for this reason that I employ the relief valve above described. With this valve applied in the manner shown in Figs. 1 and 2 of the drawings when the flow of liquid from the hose is shut off, liquid discharged from the pump will still pass through the valve 25 to the air chamber and hose until the pressure in the body member 30 reaches a certain predetermined point, governed by the tension of the spring 45. At this point, the diaphragm 39 will be forced downwardly and will act through the valve stem 50 to open the normally closed valve 48. Inasmuch as there will be considerable back pressure against the valve 25 from the air tank and hose all further fluid forced by the pump into the body portion 19 instead of forcing the valve 25 open and passing to the air chamber will pass through the nipple 31, hose 32 and body portion 34, the valve of which is open, to the hose 18 and back to the tank. It will therefore be seen that under certain abnormal conditions, the relief valve provides in effect a bypass between the discharge pipe of the pump and the tank from which the fluid is being drawn by the pump, thus rendering the action of the pump ineffective. As soon, however, as the hose nozzles are turned on for use, the pressure in the body portion 30 being decreased, the natural resiliency of the diaphragm 39, together with the resiliency of the spring 45, will raise the valve 48, closing the same and prevent all further flow of fluid through the bypass when the system will again operate in the usual manner.

The opening 54, while normally closed, provides a simple and effective means for completely draining all water or other fluid from the lower portions of the valve body after use. In draining said valve body, the nut 44 is removed to render the spring 45 inoperative when the stem 41 may be readily pressed downward, only pressure such as is required to overcome the stiffness of the diaphragm 39 being required to open the valve 48 and permit any liquid in the upper portion of the body member 34 to drain into the lower portion and hence from the valve body.

Although I have illustrated and described the valve body as formed in a number of given portions, it will of course be understood that certain of the parts now separably formed may be cast or otherwise formed in one piece although I prefer the construction described as it is simpler and more economical to manufacture. Furthermore, in case of breakage or injury of any part the same may be readily replaced at small cost, whereas if the entire valve was formed in one or two pieces the cost of replacement would be greatly increased.

Having thus described the invention, what is claimed as new is:

1. A relief valve including a body member providing an uninterrupted fluid passageway and a second passageway, a valve controlling flow of fluid through the second passageway, and a diaphragm cutting off communication between the passageways and subject to pressure of fluid passing through the first passageway adapted to open the valve upon excessive pressure in the first passageway.

2. A relief valve including a body member providing fluid passageways, a valve controlling flow of fluid through one of the passageways, a diaphragm cutting off communication between the passageways and adapted upon excessive pressure in the other passageway to open the valve, the diaphragm being operable by pressure in the passageway not having the valve which is always open for passage of fluid, and means for adjusting the diaphragm to operate at varying pressures.

3. A relief valve including a tubular body member open at its ends and provided at one side with an opening, surrounded by a peripheral flange, a diaphragm extending across the opening, a stem carried by the diaphragm and slidable through the opposite side of the body member, a spring surrounding the stem exteriorly of the body member, an adjusting nut threaded upon the stem and bearing against the spring to tension the same, a second tubular body member provided at one end with a valve seat, and intermediate its length with a discharge opening and at its other end with a flange engaging in the flange surrounding the opening of the first body member to bear against the outer edge portion of the diaphragm, means for securing the body members together, and a valve coacting with the valve seat and having a valve stem operatively connected to the diaphragm.

4. A relief valve including a tubular body member provided at one side with an opening, said body member being open at its ends, a second tubular body member open at its ends adapted for attachment at one end about the opening of the first body member, said second body member being provided intermediate its length with a discharge nipple and at its free end with a valve seat, a pressure diaphragm clamped between the body members to shut off communication therebetween, a valve co-acting with the valve seat and operatively connected to the diaphragm to hold the valve to its seat until pressure against the opposite side of the diaphragm becomes too great, and means for varying the tension of the diaphragm.

5. A relief valve including a tubular body member provided at one side with an opening, said body member being open at its ends, a second tubular body member open at its ends adapted for attachment at one end about the opening of the first body member, said second body member being provided intermediate its length with a discharge nipple and at its free end with a valve seat, a pressure diaphragm clamped between the body members to shut off communication therebetween, a valve co-acting with the valve seat and operatively connected to the diaphragm to hold the valve to its seat until pressure against the opposite side of the diaphragm becomes too great, an elbow coupling carried by the free end of the second body member, and a drain plug located in said coupling.

6. A relief valve including a hollow body member open at its ends and provided at one side with an opening, a diaphragm extending across the opening in the side, a stem carried by the diaphragm and slidably through the opposite side of the body member, means exterior of the body member yieldably tending to draw the stem outward, said means being adjustable, a second body member open at its ends and attached to the first with one of its ends surrounding the diaphragm of the first body member, a valve adapted to close the opposite end of said second body member, and a valve stem operatively connecting the valve and diaphragm whereby the valve remains closed until pressure in the first body member becomes too great, said second body member being provided intermediate its length with a discharge opening.

7. A relief valve including a tubular body member provided at one side with an opening, a second tubular body member adapted for attachment at one end about the opening of the first body member and provided intermediate its length with a discharge opening and between its free end and such opening with a valve seat, a diaphragm secured between the body members to cut off communication therebetween, and a valve co-acting with the valve seat and operatively connected to the diaphragm whereby the valve remains closed until pressure in the first body member becomes too great.

In testimony whereof I affix my signature in presence of two witnesses.

DWIGHT W. WADSWORTH. [L. S.]

Witnesses:
 JOHN H. BRITTON,
 JOHN R. GIFFEN.

Copies of this patent may be obtained for five cents each, by addressing the "Commissioner of Patents, Washington, D. C."